Nov. 5, 1968   T. W. FARGO ET AL   3,409,780
RADIATION SENSITIVE METHOD AND MEANS FOR THE
DETERMINATION OF AREAS
Filed Feb. 24, 1966
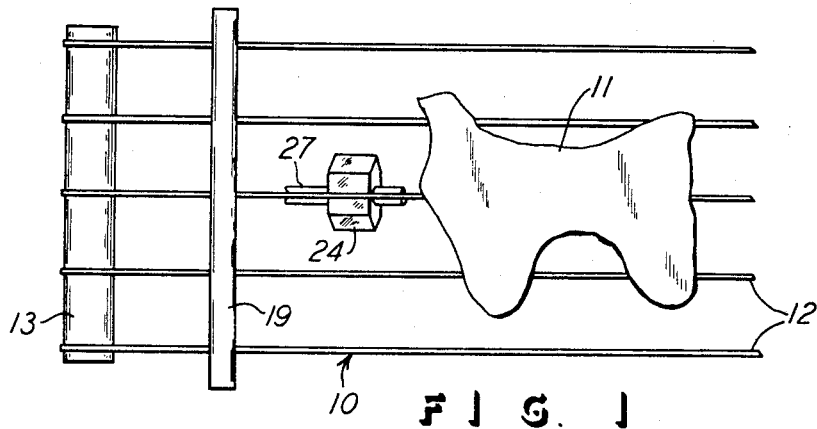
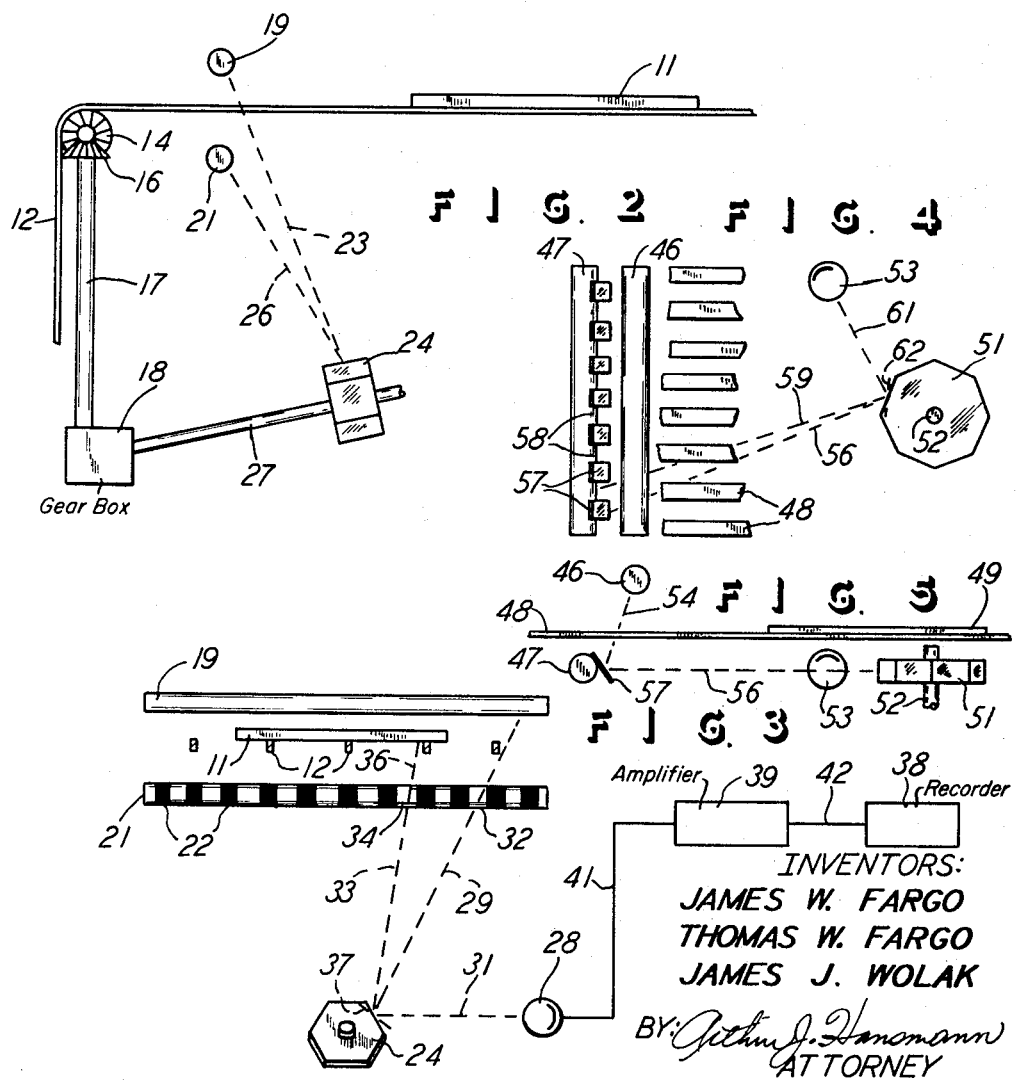
INVENTORS:
JAMES W. FARGO
THOMAS W. FARGO
JAMES J. WOLAK
BY: Arthur J. Hanamann
ATTORNEY United States Patent Office 3,409,780
Patented Nov. 5, 1968

3,409,780
RADIATION SENSITIVE METHOD AND MEANS
FOR THE DETERMINATION OF AREAS
Thomas W. Fargo, Racine, James W. Fargo, Kenosha, and
James J. Wolak, Brookfield, Wis., assignors to Custom
Control Products, Inc., Racine, Wis., a corporation of
Wisconsin
Filed Feb. 24, 1966, Ser. No. 529,679
12 Claims. (Cl. 250—223)

This invention relates to a method and means for the detection of items, such as measuring the area of sheets, including hides, metal sheets, plastic sheets, and like planar sheets or objects presenting a projected area though they may be of irregular outline.

Methods and machines for detection of items, such as area measurement and item counting, are known and exist in certain forms and constructions. Some of these are mechanical, some are electrical, but the mechanical have been found difficult to adjust and maintain for accuracy, and the electrical are of critical and/or unstable functional characteristics. Electrical apparatus of certain design is inherently subject to variation and fluctuation in accordance with its construction and amount of wear imposed upon it.

Accordingly, it is a general object of this invention to improve upon the methods and machines heretofore known for detection of items, such as the measurement of the projected areas of the items. In accomplishing this particular object, a method and means are employed which can be easily operated even by operators who are not highly skilled, and which is more stable and accurate than machines heretofore known.

A more specific object of this invention is to provide a method and means for the detection of items, wherein the method and means are relatively inexpensive, easily maintained, and utilize only a minimum of components while maintaining a high degree of accuracy in their functions. These objects are accomplished by a method and means which operate while the measured item is moving along a conveyor or the like, and the conveyor need not be stopped but the item is simply passed adjacent the means involved herein and the projected area of the item, or like measurement and recording thereof, is detected.

Another object is to provide an item detection method and means wherein rays, such as rays of light, are employed and a minimum of ray distortion and parallax and like inaccuracies are involved.

Still other objects of this invention include the provision of method and means which are effective for the purposes mentioned, and wherein the means can be stopped at any point in its operation for inspection or other reasons, and it can be started again without affecting the accuracy of the detection, and without starting from a beginning point again.

Other objects and advantages become apparent upon reading the following description in light of the accompanying drawings wherein:

FIG. 1 is a top plan view of one embodiment of this invention with parts thereof broken away and parts omitted.

FIG. 2 is a side elevational view of FIG. 1 with parts added thereto.

FIG. 3 is an end elevational view of FIG. 2 with parts omitted and added, and with the item in a different position.

FIG. 4 is a top plan view, similar to FIG. 1, but showing another embodiment.

FIG. 5 is a side elevational view of FIG. 4.

The method and means of this invention are described hereinafter, with reference to the drawings which show a conveyor 10 for supporting an item 11 which is to be measured in its projected area of FIG. 1, and/or which is to be counted. The item 11 simulates an animal hide having an irregular shape, and the object is to measure the area as seen in FIG. 1. The conveyor 10 supports the item 11 and moves it from right to left in FIG. 1. Conveyor belts or strings 12 are movably supported by a pulley or drum 13 for support and movement of the hide or item 11. For one conventional drive of the pulley or drum 13, there may be a bevel gear 14 on the end thereof, and a meshing bevel gear 16 is shown supported on a shaft 17 which extends into a gear box 18. By suitably powering the shaft 17 from the box 18, the pulley 13 is rotated at a predetermined speed for predetermined linear movement of the conveyor belts 12.

The conveyor 10, and thus the item 11, extends between an upper ray-emitting source 19 and a lower ray-emitting source 21. These two sources may be electric light tubes, which of course would be electrically connected in any suitable manner for energizing them. FIG. 3 indicates that the upper tube 19 emits light uniformly along its length, but the lower tube 21 emits light only intermittently at regular spaced-apart intervals along its length. Thus the dark areas designated 22 do not emit light and they may be blacked out in any convenient or conventional manner.

FIG. 2 shows a dotted line designated 23 and indicating a light ray or other type of ray extending from the ray-emitting source 19 to a multi-sided mirror 24. Likewise, the dotted line 26 indicates a ray extending from the source 21 to the same spot on the mirror 24. The mirror 24 is shown mounted on a shaft 27, rotatably mounted in any suitable manner, and which is suitably connected to the gear box 18. The rotation of the mirror 24 and the linear movement of the conveyor belts 12, and thus the linear movement of the hide or item 11, are synchronized in a desired manner explained later. This synchronization gives the suitable movement and coaction between the item 11 and the apparatus described herein so that the item can be measured in its projected area as it passes between the sources 19 and 21.

FIG. 2 shows that the ray sources 19 and 21 are disposed in a common vertical plane, and the scanning device or mirror 24 is offset from that plane and is tilted for purposes of receiving the rays 23 and 26 and reflecting them onto a receiving device or photocell 28 in FIG. 3. Also, FIG. 2 shows that, in that position, the item 11 is not directly disposed between the sources 19 and 21, but FIG. 3 shows the item 11 directly between the sources 19 and 21. Thus, when the scanning device or mirror 24 is in the position shown in FIG. 3, a ray designated 29 will fall upon one face of the mirror 24 and be reflected along the ray line designated 31 and directly into the photocell 28. At the same time, rays such as rays of light emitted from the ray-emitting portion or area designated 32 on the source 21, will also fall along the line 29 and be reflected into the photocell 28. That is, when the scanner or mirror 24 is in a position to receive rays which are not blocked by the item 11, both the sources 19 and 21 emit these rays and the scanner or mirror 24 reflects them into the photocell 28. However, when the item 11 is in a position intermediate the source 19 and the mirror 24, then a ray cannot be emitted from the source 19 to the mirror 24 over the length of the source 19. This condition is shown by the dotted line designated 33 which indicates a ray created by the area 34 on the lower source 21. The ray line 33 is extended along the upper section designated 36, to show that the ray line 33 cannot reach the source 19 and that any ray from the source 19 along the line 33 is blocked by the item 11. Then, when the mirror 24 is rotated to the position shown by the dotted side designated 37, the ray 33 will be reflected into the photocell 28, but there is then no ray emitted from the upper source 19 and reflected into the photocell 28.

Further rotation of the mirror 24 will create the scanning of the entire width for that dimension of the item 11 in the direction transverse to its direction of movement along with the movement of the conveyor 10. Further, the photocell 28 being responsive to light and dark alterations impressed upon it, it will be able to send a signal to a recorder 38 through an amplifier 39, with these components being connected by connections indicated by the lines 41 and 42.

It will therefore be understood that the conveyor 10 does not interfere with the passage of rays to the scanner 24 in that the conveyor may be of a very thin string construction of the belts 12, or it may be fully transparent, or the belts 12 may be aligned with the light areas 34 with respect to the rays falling on the multi-sided mirror 24. Thus, when the item 11 blocks out at least a portion of the source 19, then the scanner is sensitive only to the discontinuous or intermittent source 21 which alternates between light emitting and no emitting as the scanner operates over the length of the source 21. This alternation of ray emitting is of course sensed by the photocell 28 and the recorder 38 which registers the pulsing. This may indicate the area of item 11 by a formula or other common mathematical relationship. Of course the photocell 28 is thus an electro-optic device which is focused on the mirror 24 by any suitable and conventional lens system or focusing means. The pulse or signal reecived by the element 28 is then transmitted to the amplifier 39 and then to the recorder 38, which may be a computer. The components, particularly the sensor 28, are insensitive to variations in ray intensity, but they respond to the presence or relatively complete absence of rays, such as rays of light. This therefore creates the necessary pulses in the alternation of light and dark spots falling upon the scanning device and sensed by the component 28. The component 38 may be a recorder or computer which, through mathematical operation for automatic indication, it will indicate the area of the item 11, and such recordings may be placed on data cards or like conventional components.

One arrangement for accomplishing this is to have the the mirror 24 revolve in synchronization with the conveyor 10 such that the mirror scans the full length of the sources 19 and 21 once for each one-tenth of one foot of movement of the conveyor 10. Also, the pairs of light and dark regions of the discontinuous ray source 21 are spaced to represent equal increments across the width of item 11, such as, to represent one-tenth foot intervals. Thus, as the conveyor moves forward with its material or item 11, a pulse or count will be developed for each one one-hundredth square foot of material which passes between the sources 19 and 21. Of course, in addition to actually measuring the area of the item 11, the equipment would inherently record the passage of each item 11, by virtue of registering area measuring pulses itself, and thus the number of items 11 may be automatically counted as well as measured in area.

FIGS. 4 and 5 show another embodiment, and consequently another attending method, wherein the upper and lower ray-emitting sources are designated 46 and 47. These may again be light sources of light tubes as shown. They would of course be suitably mounted and electrically energized by any conventional means. Again the conveyor extends between the sources 46 and 47, and it is shown to include the belts 48. Then the item to be measured is designated item 49 and is disposed on the belts 48 to move between the sources 46 and 47, as described in connection with the other embodiment.

A multi-sided mirror 51, and shown to be an octagonal mirror, is mounted on a shaft 52 which is rotatably mounted in any manner so that the mirror 51 will rotate in synchronization with the movement of the conveyor or belts 48. Again a sensor or photocell 53 is also provided and is focused on the mirror 51, as indicated in FIG. 4.

It will be noted that the sources 46 and 47 are not disposed in a common vertical plane, but they are disposed actually to provide an acute angle between the ray designated 54 and the ray designated 56, these being the rays extending from the source 46 to a mirror 57 disposed in front of the source 47, and the ray 56 extending from the mirror 57 to the mirror 51. Thus it will now be understood that the lower source 47 is provided with mirrors 57 which are disposed at an angle to reflect rays from the source 46 to the mirror 51. Of course the lengths designated 58 on the source 47 and extending between the mirrors 57 will also emit rays, such as the ray designated 59, to the mirror 51. Thus the mirrors 57 serve as the blocked out areas 22 of the source 21 in FIG. 3.

It will therefore be understood that when the item 49 moves between the sources 46 and 47, that is in the path of the ray 54, then the only rays detected by the mirror 51 will be those emitted by the lengths 58 of the lower source 47. The mirrors 57 will of course not be receiving any rays from the upper source 46, and they will therefore not reflect any rays, such as the ray 56, to the mirror 51. Thus the desired alternation of light emitting and no emitting is again achieved so that the amplifier and recorder or computer can again be connected with the photocell 53 to measure the area of the item 49. Such activation of the item or photocell component 53 is caused by the reflected beam or ray 61 coming off the mirror 51. Of course when the mirror 51 rotates to where the dotted side designated 62 is in the position shown, then the ray 56 will be properly focused onto the photocell 53, as desired in the scanning of the entire length of the source 47.

This arrangement permits the mirror 51 to be aligned only with the lower source 47, and of course the rays emitted from the upper source 46 are directed to the lower source 47 and are therefore also accurately reflected off the mirrors 57 and into the mirror 51 without dispersion or parallax or other inaccuracies. Further, the belts 48 may exist in great numbers, such as indicated in FIG. 4, and they are shown to align with the ray-emitting lengths 58 and are not of a width greater than the lengths 58. Thus the belts 48 do not in any way interfere with the area measurement of the item 49 since, when item 49 is not between the sources 46 and 47, the scanning shows light along the entire scanned lengths as the rays are emitted from either the mirrors 57 and also from the lengths of the upper source 46 as they project to the mirrors 47, and along the lengths 58 of the lower source 47.

Of course in the second embodiment of the method and means just described, the speed of the movement of the item 49 and the speed of the scanning by revolving the mirror 51 are related, such as through the common drive described and shown in FIG. 2, and they are therefore synchronized so that the pulses registered on the components 28 and 38 will be related to the area of the item 49, as desired. Such synchronization could be as described in connection with the other embodiment regarding the drive of the conveyor 10 and the rotation of the mirror 24.

The foregoing description inherently includes the description of the method as well as the apparatus involved herein, and the appended claims also describe the method and apparatus, and while two methods and apparati are shown, it will be understood that certain changes can be made therein, and the scope of the invention should therefore be determined only by the appended claims.

What is claimed is:

1. A method of detection of items, comprising the steps of moving an item between two ray-emitting sources sensitive to the presence of said item therebetween, scanning said sources by scanning means disposed to one side of said item and arranged and located to receive rays simultaneously and separately from both of said sources, alternately emitting and blocking rays to said scanning means from said one of said sources, blocking the emitted rays from the other of said sources to said scanning means upon the passage of said item between said other of said sources and said scanning means, and recording the alternations of emitting and blocking of rays to said scanning means.

2. The subject matter of claim 1, wherein said scanning extends across said item in the direction transverse to the direction of movement of said item and is at a speed synchronized with the speed of movement for measuring the area of said item.

3. The subject matter of claim 2, wherein said sources emit light and said scanning is optically responsive, and said one of said sources is alternatively emitting by reflecting rays of light from the other of said sources to said scanning means.

4. Apparatus for the detection of items, comprising two spaced-apart ray-emitting sources, a conveyor extending between said sources and being arranged to be free of any significant blocking of rays from said sources and being adapted to support and move an item between said sources, ray-scanning means disposed on one side of said conveyor and arranged and located to receive rays separately and simultaneously from both said sources, means included in the one of said sources on said one side of said conveyor for emitting rays intermittently relative to the scanning rays of said one source, the other of said sources being arranged and located to be blocked in emitting rays to said ray-scanning means when said item passes between said sources, and recording means operatively connected to said ray-scanning means and sensing and recording the alternations of emitting and blocking of rays to said ray-scanning means.

5. The subject matter of claim 4, wherein said sources are light-ray emitting sources and said ray-scanning means is an optically sensitive means for detecting the light rays.

6. The subject matter of claim 5, wherein said sources are elongated light-ray tubes extending transverse to the direction of conveyance of said item, said one of said sources being arranged with alternate light and dark areas along its length for interruptingly emitting light rays to said ray-scanning means upon scanning along said one source.

7. The subject matter of claim 6, wherein said tubes are located in a common vertical plane, and said ray-scanning means is offset from said plane to sense light rays emitted from both said tubes.

8. The subject matter of claim 4, wherein said ray-scanning means is arranged to scan across said item transverse to the direction of movement of said conveyor and with the speed of scanning being synchronized with the speed of movement of said conveyor.

9. The subject matter of claim 5, wherein a multi-sided revolving mirror and a photocell are included as parts of said ray-scanning means.

10. The subject matter of claim 8, wherein elongated light-emitting tubes are said sources, and a plurality of mirrors are spaced along said one of said sources to provide the means for intermittent ray emitting by reflecting light rays from said other of said sources to said scanning means, except when said item is between said sources.

11. The subject matter of claim 10, wherein said scanning means includes a multi-sided rotatable mirror focused on said one light source and said plurality of mirrors.

12. The subject matter of claim 11, wherein said conveyor includes belts for supporting said items, each of said belts being of a width no greater than, and being aligned with, the spacing between said mirrors.

References Cited

UNITED STATES PATENTS

| | | | |
|---|---|---|---|
| 2,354,767 | 8/1944 | Nokes | 250—222 X |
| 2,356,761 | 8/1944 | Jones et al. | 250—222 X |
| 2,359,934 | 10/1944 | Nokes et al. | 88—14 |

WALTER STOLWEIN, *Primary Examiner.*